United States Patent [19]
Bottum

[11] 4,344,415
[45] Aug. 17, 1982

[54] SOLAR COLLECTOR

[76] Inventor: Edward W. Bottum, 9357 Spencer Rd., Brighton, Mich. 48116

[21] Appl. No.: 138,294

[22] Filed: Apr. 8, 1980

[51] Int. Cl.³ .............................................. F24J 3/02
[52] U.S. Cl. .................................... 126/434; 126/435; 165/104.34
[58] Field of Search ............... 126/432, 433, 434, 435, 126/448, 446, 436; 165/139, 176, 105, 106

[56] References Cited

U.S. PATENT DOCUMENTS

| | | | |
|---|---|---|---|
| 3,390,672 | 7/1968 | Snelling | 126/433 |
| 3,987,782 | 10/1976 | Meier, Jr. | 126/434 |
| 4,003,367 | 1/1977 | Wilkholm | 126/434 |
| 4,029,080 | 6/1977 | Warren | 126/435 |
| 4,120,285 | 10/1978 | Nugent | 126/448 |
| 4,135,490 | 1/1979 | Soleau, Jr. | 126/435 |
| 4,220,138 | 9/1980 | Bottum | 165/105 |

FOREIGN PATENT DOCUMENTS

| | | | |
|---|---|---|---|
| 2307232 | 11/1976 | France | 126/433 |
| 257348 | 10/1948 | Switzerland | 126/446 |

Primary Examiner—James C. Yeung
Attorney, Agent, or Firm—Whittemore, Hulbert & Belknap

[57] ABSTRACT

A collector for use in an improved phase change refrigerant charged solar system, comprising an enclosure having a top, bottom, two sides, a heat absorbing back, and a front which is transparent to the sun's rays, a transfer conduit extending into the collector enclosure adjacent the top thereof, and a collector coil connected to the transfer conduit adjacent the top of the collector enclosure and extending horizontally therein.

6 Claims, 4 Drawing Figures

SOLAR COLLECTOR

BACKGROUND OF THE INVENTION

1. Field of the Invention

The invention relates to improved phase change refrigerant charged solar systems, and refers more specifically to an improved collector for use therein, having collector coils positioned only adjacent the top of the collector enclosure.

2. Description of the Prior Art

In the past, solar collectors used to convert the sun's rays into heat energy have usually transferred the heat to a liquid or gas to be transferred to a point of ultimate use. One such structure is illustrated in detail in applicant's prior U.S. Pat. No. 4,026,272.

In such prior structure, heat generated in a collector enclosure is transferred from a metal absorbing plate to a sinuous metal tube secured to the heat absorbing plate in a manner to provide direct heat transfer to a refrigerant or the like travelling through the sinuous tube.

Such structure is heavier, more difficult to fabricate, and has been found to be more costly than necessary or desirable.

SUMMARY OF THE INVENTION

In accordance with the invention, improved collector structure is provided for a phase change refrigerant charged solar system or the like, which improved collector includes an enclosure having a top, bottom, two sides, a heat absorbing back, and a front transparent to the sun's rays.

The collector of the invention in one embodiment further includes a transfer conduit for a heat transfer medium such as a refrigerant positioned adjacent one side of the collector enclosure and a single collection coil connected to the transfer conduit extending substantially horizontally adjacent the top of the enclosure.

In another embodiment of the invention, the transfer conduit for the heat transfer medium is positioned centrally of the collector enclosure and extends between the top and bottom thereof. In this embodiment, single heat absorbing conduits extend in both directions from the central transfer conduit toward both sides of the enclosure.

In either embodiment, the collector coil may be a U-shaped finned conduit and may be connected at opposite ends to an accumulator having sight glasses therein for determining the condition of refrigerant charge of the overall solar system.

DESCRIPTION OF THE PREFERRED EMBODIMENT

Figure 1:
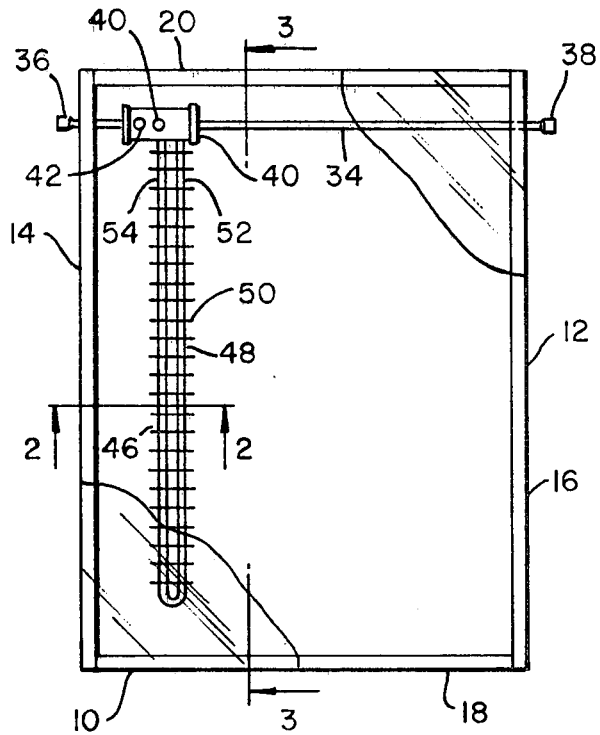
FIG. 1 is a front elevation view of a solar collector constructed in accordance with the invention.
Figure 2:
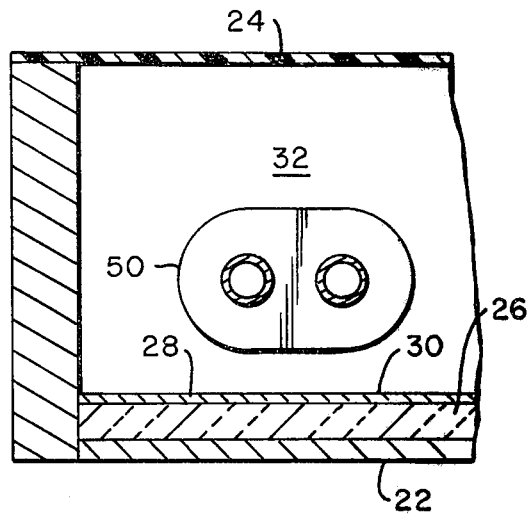
FIG. 2 is a section view of the solar collector illustrated in FIG. 1, taken substantially on the line 2—2 in FIG. 1.
Figure 3:
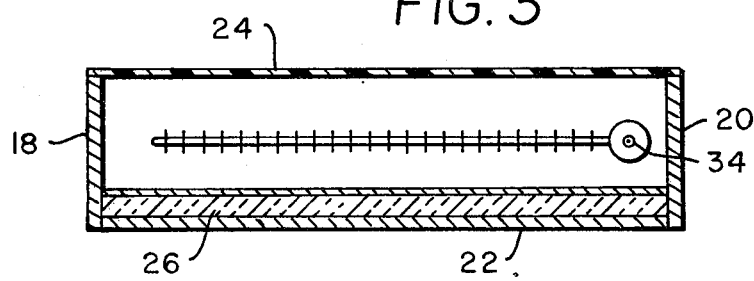
FIG. 3 is an enlarged partial section view of the solar collector illustrated in FIG. 1, taken substantially on the line 3—3 in FIG. 1.
Figure 4:
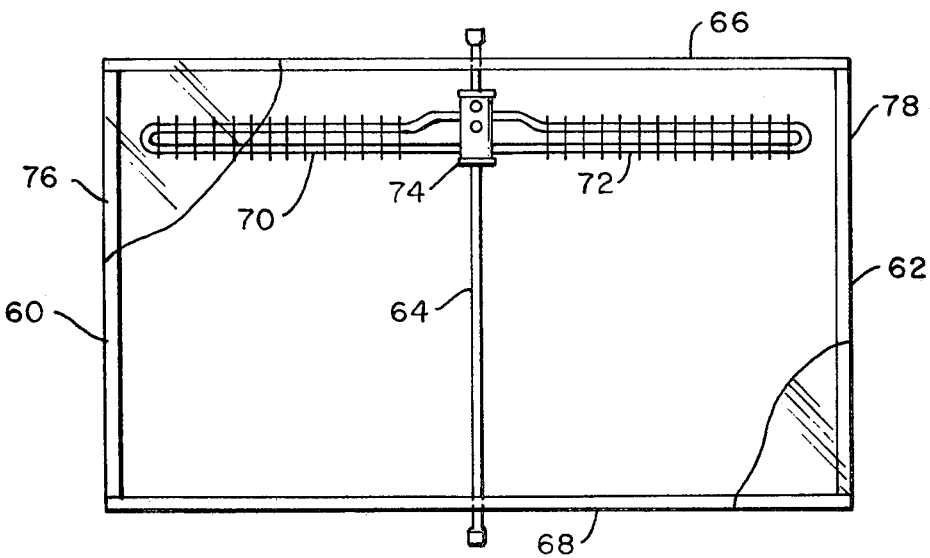
FIG. 4 is a front elevation view of a modification of the solar collector illustrated in FIG. 1.

As shown in FIGS. 1-3, the solar collector 10 of the invention includes an enclosure 12, including a top 14, a bottom 16, sides 18 and 20, back 22 and front 24.

The top 14 and bottom 16 of the enclosure 12 are vertically spaced apart, are horizontally extending, and are substantially parallel. The top 14 and bottom 16 may be constructed of insulating material or may be insulated, as desired. Insulation of the top 14 is particularly desirable.

The sides 18 and 20 of the enclosure 12 extend substantially vertically and are in horizontal, parallel spaced relation. Again, the sides 18 and 20 may be of insulating material or may be insulated, as desired.

The back 22, as shown best in FIG. 2, may be insulated by insulating material 26 such as fiber glass or the like and includes a plate 28 which may be of any suitable material and may be, but is not necessarily, metal. Plate 28 may be flat or corrugated, or of other suitable shape. The surface 30 of the plate 28 toward the interior 32 of the enclosure 12 should include thereon a suitable heat absorbing paint or may otherwise be constructed to absorb heat.

The front 24 of the enclosure 12 is transparent to the sun's rays. It is also desirable that the front 24 of the enclosure 12 be insulated. Thus, a double glazing of the front 24 may be utilized effectively.

As shown best in FIG. 1, a transfer conduit 34 extends through the bottom 16 and top 14 of the enclosure 12. The conduit 34 has fittings 36 and 38 at the top and bottom thereof whereby the collector 10 may be connected in a solar heating system or the like. That is, it may be connected to a heat exchanger or pump as required by passive or active solar heating systems. A heat transfer medium such as a refrigerant may be passed through the transfer conduit 34 in the known manner of solar heating systems.

As shown best in FIG. 1, the transfer conduit 34 is positioned adjacent the side 20 of the enclosure 12 and extends substantially parallel thereto in spaced relation therefrom.

An accumulator 40 is connected into the transfer conduit 34 adjacent the top 14 of the enclosure 12 inside the enclosure 12. Vertically spaced apart sight glasses 42 and 44 are provided in the accumulator 40.

A collector coil 46 is connected to the transfer conduit 34 through the accumulator 40, as shown best in FIG. 1. The collector coil 46 is a generally U-shaped coil having cooling fins 50 associated therewith. The lower end 52 of the coil 46 is connected to the accumulator 40 below sight glass 44, while the upper end 54 of the coil 46 is connected to the accumulator 40 between the upper and lower sight glasses 42 and 44.

Thus, as shown best in FIG. 1, the finned coil 46 extends from adjacent the one side 20 of the accumulator enclosure 12 toward the other side 18 thereof adjacent to but in parallel spaced relation to the top 18 of the enclosure 12.

In operation of the collector 10, the system with which it is associated and the transfer conduit 34 are first charged with, for example, a refrigerant until the lower sight glass ball floats but the ball in the upper sight glass does not.

Then, with the collector 10 positioned so that its front faces the sun, as the sun strikes the collector, the plate 30 will absorb heat and heat the air in the enclosure 32.

The heated air rises by convection and passes through the finned coil 46.

As heat is given up to the liquid refrigerant in the coil 46, the refrigerant will boil and move by its own vapor pressure out of the collector through the coupling 36.

The collector 10 may be utilized in either an active or passive solar system. In a passive system, a heat exchanger would be installed higher than the collector coil 46, and as refrigerant vapor is condensed in the heat exchanger coil, liquid refrigerant would return to the collector coil by gravity through the coupling 38 and transfer conduit 34.

In an active system, the heat exchanger may be installed in a lower position, if desired, and the liquid refrigerant may be returned by a pump.

In the modified collector 60, the enclosure 62 is substantially the same as the enclosure 12. However, the conduit 64 extends vertically through the collector 60 between the top 66 and bottom 68 thereof in parallel relation to and in substantially equal spaced relation from the sides 60 and 62.

The finned coils 70 and 72 of the modified collector structure 60 then extend as shown from both sides of the accumulator 74 toward both sides 76 and 78 of the enclosure 62.

The operation of the collector structure 60 is substantially the same as the operation of the collector structure 10.

Either collector structure 10 or collector structure 60 provides a refrigerant charged collector which is lighter in weight and more easily fabricated than prior structures, as considered above. The cost of such collectors should, therefore, be reduced without a corresponding reduction in efficiency of the collectors.

While one embodiment of the present invention has been considered in detail, it will be understood that other embodiments and modifications are contemplated. Thus, it will be understood that lines 34 and 64 need not project through the top and bottom of the enclosure. Alternatively, a conduit from the lower back or bottom of the accumulator may extend through the back of the enclosure. Also, the top of the accumulator may extend through the top of the enclosure. It is the intention to include all such embodiments and modifications as are defined by the appended claims within the scope of the invention.

I claim:

1. A solar collector comprising a generally rectangular enclosure having parallel, horizontally extending, vertically spaced apart top and bottom, two parallel, vertically extending, horizontally spaced apart sides, and parallel, vertically extending, horizontally spaced apart front and back, said back having a heat absorbing surface facing the inside of the enclosure, a single transfer conduit for a heat exchange medium extending into the bottom and out of the top of the collector enclosure, a U-shaped collector coil having opposite ends in the same plane in communication with said transfer conduit within the collector enclosure adjacent the top thereof and extending substantially horizontally therein, and an accumulator positioned in the transfer conduit adjacent the top of the collector enclosure through which the collector coil is connected to the transfer conduit.

2. Structure as set forth in claim 1, wherein the transfer conduit extends in the collector enclosure adjacent one side thereof and the collector coil extends from the transfer conduit at the one side of the collector enclosure toward the other side of the enclosure adjacent the top thereof.

3. Structure as set forth in claim 1, wherein the transfer conduit extends through the collector enclosure substantially centrally thereof between the top and bottom of the enclosure and the collector coil includes two U-shaped sections each extending from the transfer conduit toward a different side of the collector enclosure adjacent the top of the enclosure.

4. Structure as set forth in claim 1, wherein the accumulator has two separate sight glasses therein spaced apart vertically and the collector coil is connected to the accumulator at two positions, one below the lower sight glass and one between the upper and lower sight glasses whereby the refrigerant charge in the transfer conduit may be determined.

5. A collector for collecting energy from the sun's rays, comprising a generally rectangular enclosure including a top and bottom which are parallel and vertically spaced apart, two sides at the ends of the top and bottom which are parallel and extend vertically and which are horizontally spaced apart, a back including a heat absorbing material on the surface thereof facing the interior of the enclosure, and a front adapted to be exposed to the sun's rays which is transparent to the sun's rays, a transfer conduit extending between the bottom and top of the collector adjacent one side thereof, an accumulator positioned within the collector enclosure having an upper and lower sight glass therein and connected into the transfer conduit adjacent the top of the one side of the collector and the top of the enclosure within the enclosure, and a U-shaped finned collector coil extending from the accumulator toward the other side of the collector enclosure, one end of which is connected to the accumulator below the lower sight glass and the other end of which is connected to the accumulator between the upper and lower sight glasses.

6. A collector for collecting energy from the sun's rays, comprising a generally rectangular enclosure including a top and bottom which are parallel and vertically spaced apart, two sides at the ends of the top and bottom which are parallel and extend vertically and which are horizontally spaced apart, a back including a heat absorbing material on the surface thereof facing the interior of the enclosure, and a front adapted to be exposed to the sun's rays which is transparent to the sun's rays, a transfer conduit extending between the bottom and top of the collector centrally thereof, an accumulator positioned within the collector enclosure having an upper and lower sight glass therein and connected into the transfer conduit adjacent the top of the enclosure within the enclosure, and a pair of U-shaped finned collector coils extending from the accumulator toward the opposite sides of the collector enclosure, one end of each of which is connected to the accumulator below the lower sight glass and the other of each of which is connected to the accumulator between the upper and lower sight glasses.

* * * * *